(12) United States Patent
Reijersen Van Buuren

(10) Patent No.: US 8,555,604 B2
(45) Date of Patent: Oct. 15, 2013

(54) WRAPPER FOR WRAPPING ROUND BALES OF CROP MATERIAL

(75) Inventor: Willem Jacobus Reijersen Van Buuren, Dirksland (NL)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 13/592,380

(22) Filed: Aug. 23, 2012

(65) Prior Publication Data
US 2012/0311961 A1 Dec. 13, 2012

Related U.S. Application Data

(63) Continuation of application No. PCT/NL2010/000173, filed on Dec. 15, 2010.

(30) Foreign Application Priority Data

Feb. 23, 2010 (NL) ...................................... 1037739

(51) Int. Cl.
*B65B 11/02* (2006.01)

(52) U.S. Cl.
USPC ............................................ 53/211; 53/587

(58) Field of Classification Search
USPC ................................... 53/211, 204, 587, 588
See application file for complete search history.

(56) References Cited

U.S. PATENT DOCUMENTS

| | | | | |
|---|---|---|---|---|
| 4,590,737 | A | * | 5/1986 | Rosenthal et al. ............... 53/211 |
| 5,046,296 | A | | 9/1991 | Drury et al. |
| 5,425,221 | A | * | 6/1995 | Pronovost et al. ............... 53/567 |
| 8,230,663 | B2 | * | 7/2012 | Viaud .............................. 53/116 |
| 2003/0089081 | A1 | * | 5/2003 | Platon ............................. 53/399 |
| 2005/0247215 | A1 | * | 11/2005 | Biziorek et al. ................. 100/87 |
| 2009/0202322 | A1 | | 8/2009 | Gette et al. |

FOREIGN PATENT DOCUMENTS

| | | |
|---|---|---|
| EP | 0983720 A1 | 3/2000 |
| EP | 2090153 A1 | 8/2009 |
| EP | 2123145 A1 | 11/2009 |
| GB | 2191984 A | 12/1987 |
| GB | 2221203 A | 1/1990 |
| WO | WO 92 20210 A2 | 11/1992 |

* cited by examiner

*Primary Examiner* — Hemant M Desai
(74) *Attorney, Agent, or Firm* — Hoyng Monegier LLP; Coraline J. Haitjema; David P. Owen

(57) ABSTRACT

A wrapper for wrapping bales, in particular round bales of crop material, includes a frame, a wrapping table to support the bale during wrapping, a wrapping device to wrap wrapping material about the bale. In particular, the wrapper has at least two lateral guiding elements arranged to enclose a bale supported on the wrapping table to limit lateral movement of the bale. At least one of the lateral guiding elements is movable between an open position and a closed position, so that the distance between top ends of the lateral guiding elements is larger in the open position than in the closed position.

13 Claims, 4 Drawing Sheets

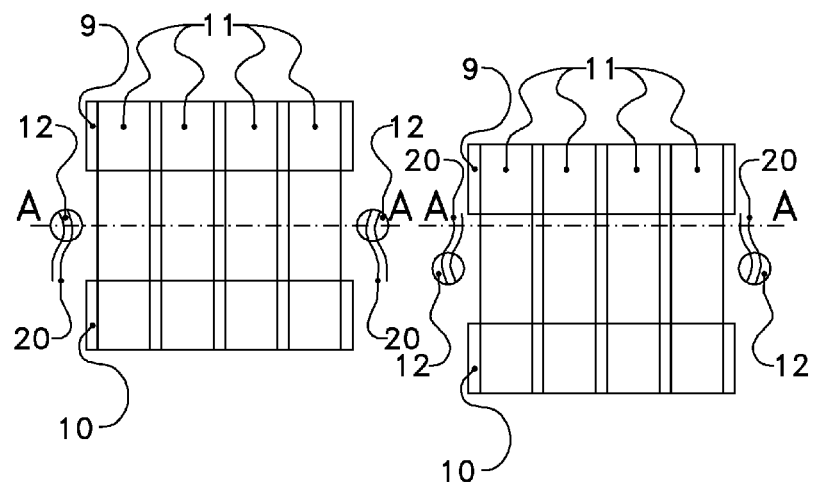

WRAPPER FOR WRAPPING ROUND BALES OF CROP MATERIAL

CROSS REFERENCE TO RELATED APPLICATIONS

This application is a continuation of PCT application number PCT/NL2010/000173 filed on 15 Dec. 2010, which claims priority from Netherlands application number 1037739 filed on 23 Feb. 2010. Both applications are hereby incorporated by reference in their entireties.

BACKGROUND OF THE INVENTION

1. Field of the Invention

The present invention relates to a wrapper for wrapping bales including a frame, a wrapping table and a wrapping device. In particular, the invention relates to a wrapper to wrap round bales of crop material.

2. Description of the Related Art

Wrappers of this type are known in the art. In a known embodiment of the wrapper, the wrapper comprises a wrapping table to support the bale during wrapping, and a wrapping device to wrap wrapping material about the bale.

The wrapping table is usually configured to rotate the bale about its axis to make a complete wrapping of the bale possible. For this reason, the wrapping table may for instance comprise rollers of which at least one is connected to a driving device; one or more conveyor belts may be provided on the rollers.

In known wrapping devices lateral guiding elements are provided at opposite sides of the wrapping table to limit lateral movement of the bale with respect to the wrapping table. The lateral guiding elements are often arranged at a distance substantially corresponding to the width of a bale so that a bale remains in substantially the same lateral position during wrapping of the bale.

Lateral guiding elements arranged at opposite sides of the wrapping table are for instance disclosed in EP 983 720, EP 2 090 153, GB 2191984 and GB 2221203, which are incorporated by reference in their entireties.

Although the presence of the lateral guiding elements is advantageous to maintain the bale in a correct position on the wrapping table, the lateral guiding elements also require a proper positioning of the bale with respect to the lateral guiding elements during placement of a bale on the wrapping table. When the bale is not correctly positioned with respect to the wrapping table the bale may be dropped on top of one or more of the lateral guiding elements. In that case the bale has to be repositioned on the wrapping table before wrapping of the bale can be started. This repositioning requires substantial time and effort.

BRIEF SUMMARY OF THE INVENTION

The aim of the invention is to provide a wrapper for wrapping bales of crop material, wherein positioning of the bale on the wrapper table is less critical, and wherein the bale remains in a correct position on the wrapping table during wrapping, or at least to provide an alternative wrapper.

The present invention provides a wrapper for wrapping bales, in particular round bales of crop material, comprising:
 a frame,
 a wrapping table mounted on the frame to support the bale during wrapping, and
 a wrapping device mounted on the frame to wrap wrapping material about the bale,
wherein the wrapper comprises at least two lateral guiding elements arranged to enclose a bale supported on the wrapping table to limit lateral movement of the bale,
characterized in that at least one of the lateral guiding elements is movable between an open position and a closed position, wherein the distance between top ends of the lateral guiding elements is larger in the open position than in the closed position.

According to the invention, the lateral guiding element can be arranged in an open position and a closed position. In the open position the distance between the top ends of the lateral guiding elements is larger than in the closed position. Such arrangement makes it possible to arrange the lateral guiding element in the open position when a bale is positioned on the wrapping table. Since the distance between the lateral guiding elements is relative large the risk that the bale is placed on top of one of the lateral guiding elements is smaller.

When the bale is supported by the wrapping table the lateral guiding element is arranged or brought in the closed position, wherein the distance between the lateral guiding elements preferably corresponds with the width of the bale. In this closed position the lateral guiding elements are relative close to each other, and the lateral movement of the bale is efficiently limited.

The movement of the lateral guiding element between the open position and the closed position may be caused by mechanical action, or by a hydraulic or electrical actuator. In an advantageous embodiment this movement is caused by a gravity force of a bale being positioned on the wrapping table.

The term enclose is used to describe that the lateral movement of the bale is limited at least in the directions where the lateral guiding elements are arranged. For instance, when the lateral guiding elements are arranged at opposite sides of the bale, movement of the bale in the direction of an imaginary line connecting the two lateral guiding elements is limited, but movement in a direction perpendicular to this line may still be possible. In case of a round bale the lateral guiding elements will be typically arranged at the crosscut sides of the bale while the cylindrical shape is held in place by the shape of the wrapping table. In such embodiment at least one lateral guiding element may be arranged at each of two opposite sides of the wrapping table.

It is remarked that the wrapping table and the wrapping device may be mounted directly or indirectly on the frame.

In an embodiment, both lateral guiding elements are movable between an open position and a closed position, wherein the distance between top ends of the lateral guiding elements is larger in the open position than in the closed position. By making both the lateral guiding elements movable between an open and closed position, the positioning of a bale becomes even more reliable. Both lateral guiding elements are moved away from the middle of the wrapping table so that the risk of bale ending on a top of one of the lateral guiding elements is reduced. Preferably all lateral guiding elements are movable between an open and a closed position.

In an embodiment the lateral guiding elements are moved from the open position to the closed position when a bale is arranged on the wrapping table.

It is remarked that the movement of the lateral guiding elements from the open position to the closed position may also have a positive effect on centring the bale with respect to the middle of the wrapping table. When the bale is positioned slightly off-centre with respect to the middle of the wrapping table, the movement of the lateral guiding elements from the open position to the closed position may push the bale to the desired central position with respect to the middle of the wrapping table.

Another advantageous aspect is that round bales of different width, for instance in the range of 1.15 meters to 1.25 meters may also be automatically centred by the movement of the lateral guiding elements.

In an embodiment, the lateral guiding elements are pivotable about a pivot axis between the open and closed position. Preferably the pivot axis is arranged at a lower level than the lateral guiding elements, and wherein the pivot axis runs substantially in a plane parallel to a side plane of a bale supported on the wrapping table. A pivotal movement of the lateral guiding elements can advantageously be used to move the lateral guiding elements between the open position and the closed position.

In an embodiment, the lateral guiding elements are freely pivotable between the open and closed position. When the lateral guiding elements are freely pivotable between the open position and the closed position, mechanical action may be used to bring the lateral guiding elements in the desired position and no hydraulic or electric actuators have to be provided to move the lateral guiding elements between the open and closed position.

In an embodiment, the lateral guiding elements are each coupled to an actuation element, wherein in the open position, the actuation element is positioned above a supporting surface of the wrapping table, and in the closed position the actuation element is positioned at the same level or below the supporting surface of the wrapping table.

In such embodiment, the mass of the bale can be used to move the lateral guiding elements between the open and closed position. The actuation element which is for instance a roller, will be positioned in the open position of the lateral guiding elements above a supporting surface of the wrapping table.

When a bale is arranged on the wrapping table, the bale will first come into contact with actuation elements. Due to the mass of the bale the actuation elements will be moved downwards, therewith moving the lateral guiding elements from the open position to the closed position. When the lateral guiding elements are in the closed position the bale will be supported on the supporting surface of the wrapping table, the actuation element being below or at the same level as the supporting surface.

To assure that the lateral guiding elements are in the open position when a bale is arranged on the wrapping table, the lateral guiding elements are preferably biased in the open position. Biasing means such as springs may be provided to urge the lateral guiding elements in the open position, but the biasing effect may also result from the gravity forces acting on the lateral guiding elements.

In an embodiment, the wrapping table is tiltable between at least a bale receiving position and a wrapping position, wherein the position of the lateral guiding elements is dependent on the position of the wrapping table, wherein when the wrapping table is in the bale receiving position the lateral guiding elements are arranged in the open position, and when the wrapping table is in the wrapping position the lateral guiding elements are arranged in the closed position. Since the position of the wrapping table is a reliable estimator for the presence of a bale on the wrapping table, the position of the wrapping table can advantageously be used to control the positioning and movement of the lateral guiding elements in/between the open and closed position.

In an embodiment, the wrapper comprises a guiding track along which at least one of the lateral guiding elements is movable to move the lateral guiding element between the open position and the closed position. A guiding track such as a curved rail may be used for moving the lateral guiding elements between the open and closed positions. Such guiding track may in particular be suitable in embodiments wherein there is a relative movement between different parts of the wrapper.

An example of such relative movement between different parts of the wrapper that can be used is the relative movement between the frame and the wrapping table resulting from movement of the wrapping table between the bale receiving position and the wrapping position. In such embodiment a guiding track may be provided which guides the lateral guiding elements between the open position and closed position when the wrapping table is moved between the bale receiving position and the wrapping position.

In an embodiment a hydraulic, electric or any other active actuator may be used to move the lateral guiding elements between the open and the closed position. In such embodiment, the wrapper may comprise a sensor to detect the presence of a bale on the wrapping table. The actuator may be activated to move the lateral guiding elements from the open to the closed position, when the presence of a bale on the wrapping table is detected.

In alternative embodiments, the activation of the actuator may be made dependent on the position of mechanical parts of the wrapper or related machinery, such as the rotational position of the wrapping table or a loading arm of the wrapper, or the rotational position of a tailgate of a baling device of a baler-wrapper combination.

BRIEF DESCRIPTION OF THE DRAWINGS

The features and advantages of the invention will be appreciated upon reference to the following drawings, in which:

FIGS. 5 and 6 show a schematic view of the lateral guiding elements of a first alternative embodiment of the invention; and FIG. 7 shows a schematic view of the lateral guiding elements of a second alternative embodiment of the invention.

DESCRIPTION OF ILLUSTRATIVE EMBODIMENTS

Figure 1:
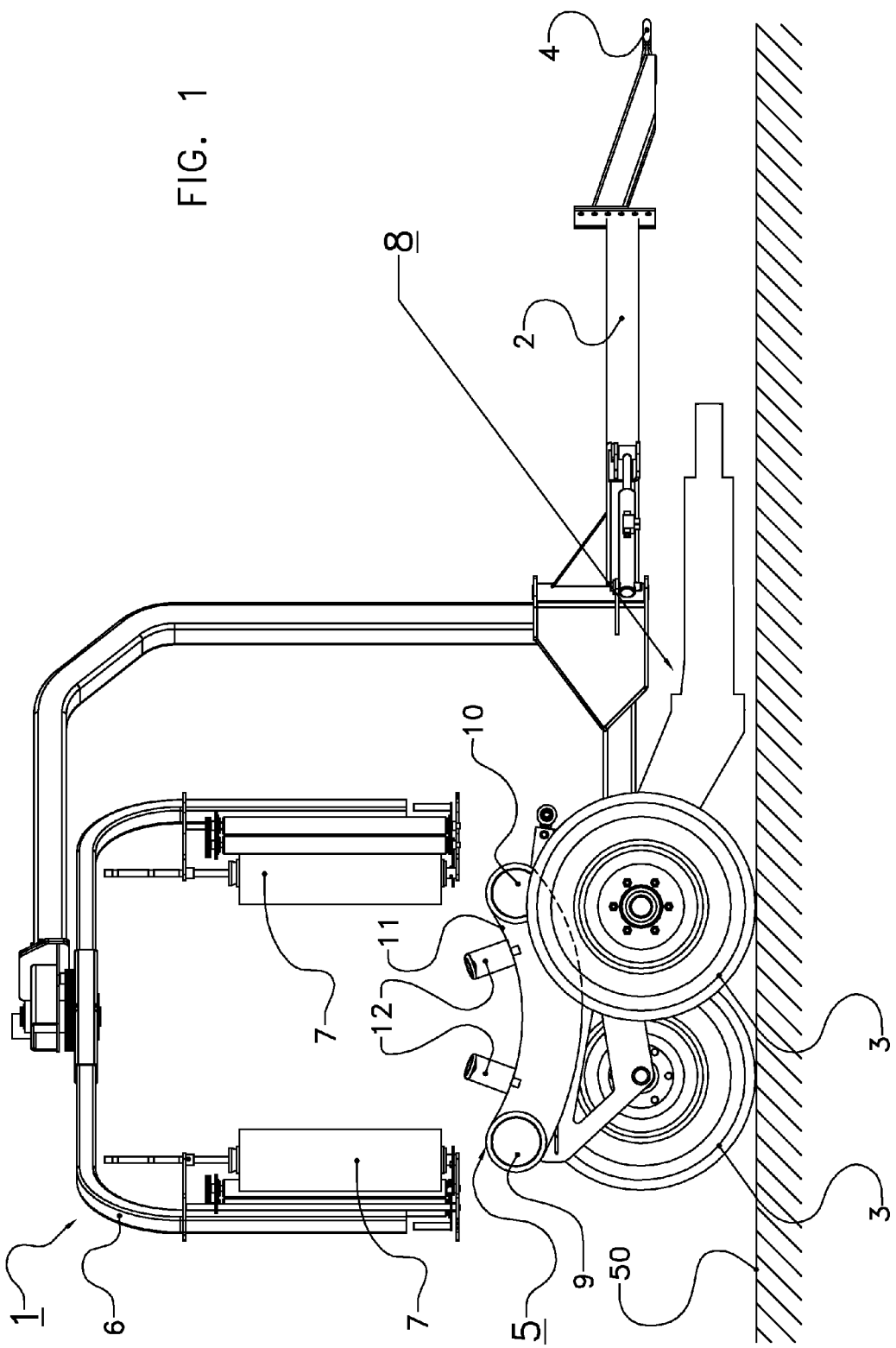
FIG. 1 shows a side view of a wrapper according to the invention.

The following is a description of certain embodiments of the invention, given by way of example only and with reference to the drawings. FIG. 1 shows a wrapper according to the invention, generally indicated by the reference numeral 1. The wrapper 1 is configured to wrap bales in wrapping material, such as plastic film material.

The wrapper 1 comprises a frame 2 which is supported on a ground surface 50 by wheels 3. The front end 4 of the wrapper 1 can be connected to a pulling vehicle (not shown) to pull the wrapper over the ground surface 50. The wrapper 1 may further be connected to a hydraulic power source of the pulling device.

A wrapping table 5 and a wrapping device 6 are mounted on the frame 2. The wrapping table 5 is configured to support a bale during wrapping. The wrapping device 6 is provided to rotate rolls of wrapping material 7 about the bale to wrap the bale in the wrapping material.

Wrapping tables 5 and wrapping devices 6 are well-known in the art, and any suitable combination may be applied in the wrapper according to the invention.

A loading device 8 is provided to load a bale from the ground surface 50 on the wrapping table 5 to enable wrapping of the bale. The loading device 8 comprises a pivotable loading structure and one or more actuators to move the pivotable loading structure between a pick-up position, in which a bale can be picked up from the ground surface (shown in FIG. 1), and a release position, in which the bale can be released on the wrapping table 5.

The wrapping table 5 comprises two rollers 9, 10 on which a number of endless belts 11 are arranged. The belts 11 define a support surface for a bale arranged on the wrapping table 5. One of the rollers 9, 10 is connected to a driving device for driving the belts 11.

At each side of the wrapping table two lateral guiding elements 12 are arranged. The lateral guiding elements 12 are mounted on the wrapping table. In alternative embodiments, the lateral guiding elements may also be mounted on the frame 2.

Figure 2:
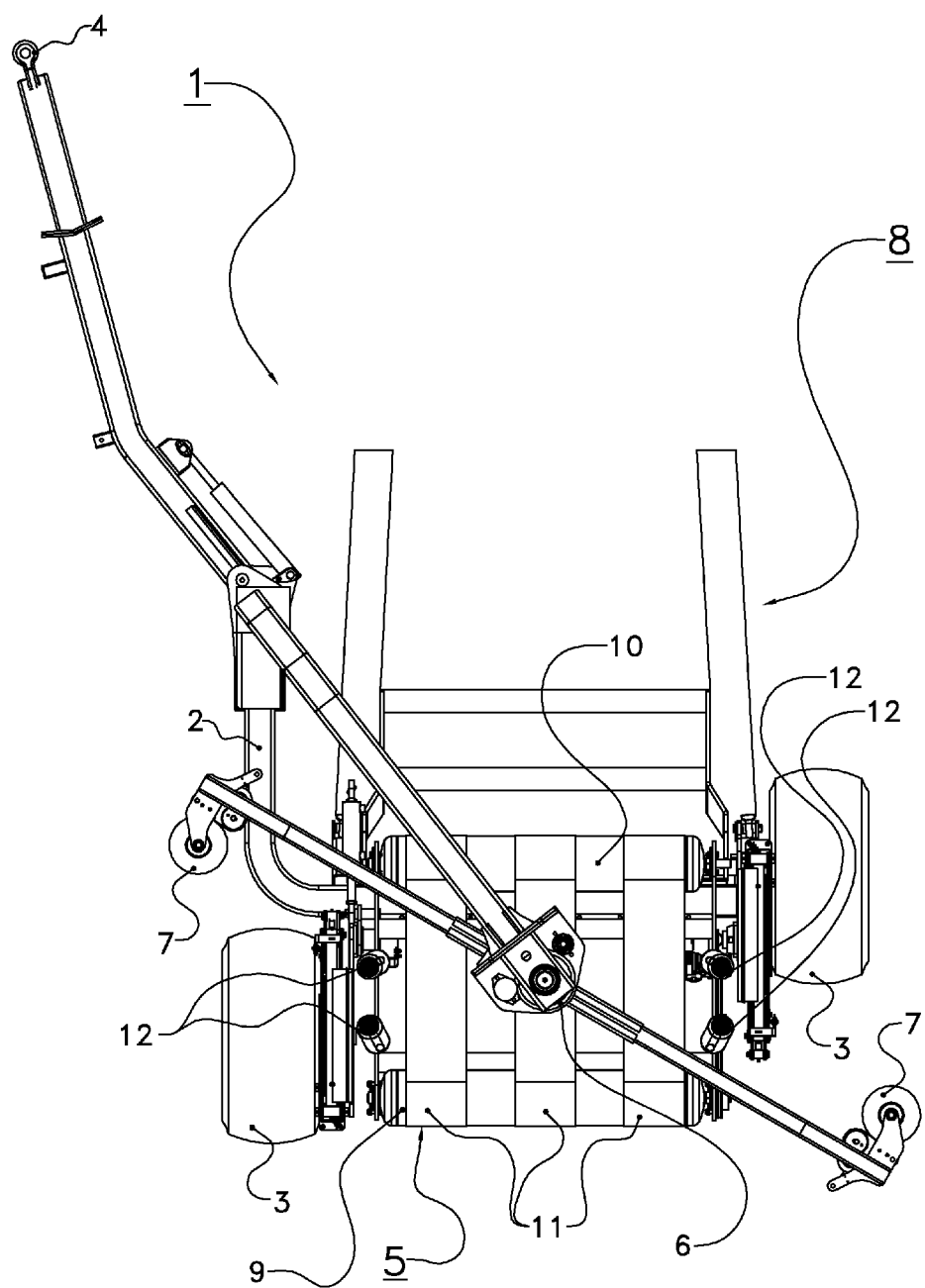
FIG. 2 shows a top view of the wrapper of FIG. 1.

The lateral guiding elements 12 are movable between an open position and a closed position. In FIGS. 1 and 2, the lateral guiding elements 12 are shown in the closed position. The distance between the lateral guiding elements at opposite sides of the wrapping table 5 in the closed position substantially corresponds to the width of a bale to be wrapped in the wrapper, i.e. the distance is the same or slightly larger than the width of the bale.

As a result, the bale supported on the wrapping table 5 is held between the lateral guiding elements 12 in closed position. Thus, the lateral guiding elements 12 limit the lateral movement of the bale, and the bale remains aligned with the middle of the wrapping table 5.

In the open position, the distance between the top ends of the lateral guiding elements 12 is larger than the distance between the top ends of the lateral guiding elements 12 in the closed position. This larger distance facilitates loading of a bale on the wrapping table 5.

The lateral guiding elements 12 and their movement between the open and closed position will now be discussed in more detail with reference to FIGS. 3 and 4.

Figure 3:
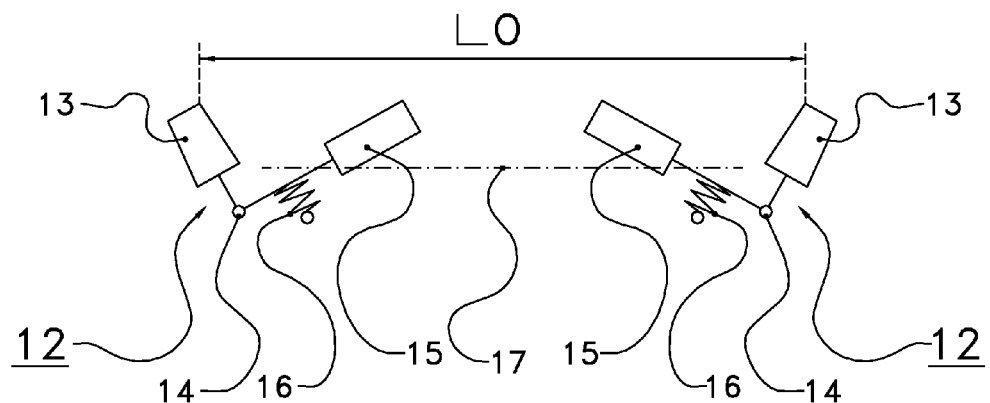
FIG. 3 shows a schematic view of an embodiment of the lateral guiding elements of the invention in the open position.
Figure 4:
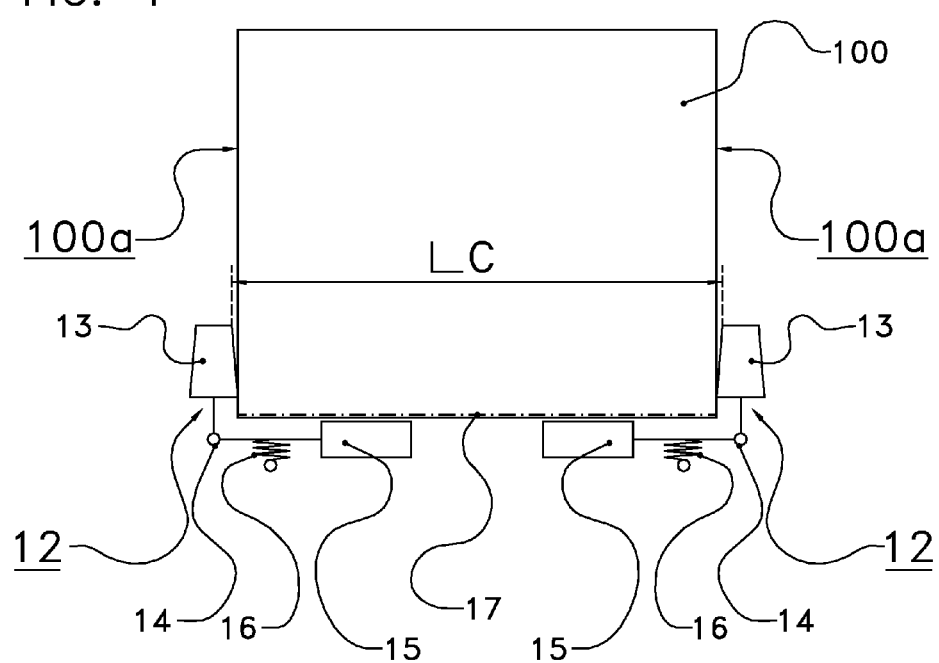
FIG. 4 shows a schematic view of the lateral guiding elements of FIG. 3 in the closed position.

FIGS. 3 and 4 schematically show an embodiment of the lateral guiding elements 12. In FIG. 3 the lateral guiding elements 12 are shown in the open position, and in FIG. 4 the lateral guiding elements 12 are shown in the closed position.

The distance LO between the top ends of the lateral guiding elements 12 in the open position (FIG. 3) is larger than the distance LC between the top ends of the lateral guiding elements 12 in the closed position (FIG. 4).

Each lateral guiding element 12 comprises a rotatable bobbin 13. The bobbin 13 has a frusto-conical shape. The rotational axis of the bobbin 13 runs, in the closed position of the lateral guiding elements 12, substantially radially with respect to the circular side surface 100a of a bale 100 supported on the wrapping table 5.

The lateral guiding elements 12 are pivotable about a pivot axis 14 between the open and closed position. The bobbin 13 is arranged on one pivot arm. On another pivot arm an actuation element 15 is provided in the form of a roller. The bobbin 13 and the actuation element 15 are fixedly coupled to each other via the double armed pivotable element comprising the two pivot arms.

The pivot axis 14 is arranged below the bobbins 13. The pivot axis runs substantially in a plane parallel to a side plane 100a of a bale 100 supported on the wrapping table (5).

The lateral guiding elements 12 are free to rotate between the open and the closed position, and are biased in the open position by a biasing element 16. As a result, the actuation elements 15 of both lateral guiding elements 12 are biased in a position above a supporting surface 17 of the wrapping table. The biasing element 16 may be any element suitable to hold the lateral guiding elements 12 in the open position when no other forces are exerted on the lateral guiding elements 12. In the shown embodiment the biasing element 16 is a spring.

Alternatively or in addition thereto, the biasing effect may also result from gravity forces acting on the respective lateral guiding element 12.

When a bale 100 is positioned on the wrapping table 5, the bobbins 13 of the lateral guiding elements 12 are arranged relative far from each other as the lateral guiding elements 12 are in the open position. The bale 100 can be relatively easily placed between the bobbins 13 so that the bale 100 is correctly positioned on the wrapping table 5. In this way it is avoided that the bale is erroneously placed on top of one of the bobbins 13.

Before the bale is supported on the supporting surface 17, the bale 100 will contact the actuation elements 15 of the lateral guiding elements 12. Due to the mass of the bale 100 and the resulting gravity forces, the lateral guiding elements 12 are pivoted towards the closed position, as shown in FIG. 4. During this movement the lateral guiding element 12 may correct a slightly off-set position of the bale and align the bale with the middle of the wrapping table 5.

The bale 100 is now correctly positioned on the wrapping table 5. Wrapping of the bale may be started, while the bale 100 is rotated by the endless belts 11 driven by the rollers 9, 10. Due to the presence of the lateral guiding elements 12 on opposite ends of the wrapping table at a distance substantially corresponding to the width of the bale, lateral movement of the bale during wrapping is avoided, or at least limited to a relative small range.

After wrapping has been finished, the bale may be released from the wrapping table 5 for instance by tilting the wrapping table 5 to a release position in which the bale rolls from the wrapping table 5 at the backside of the wrapper 1. In another embodiment, the bale may be released with the assistance of an unloading device as described in PCT/NL2010/000174, which is hereby incorporated by reference in its entirety.

FIGS. 5 and 6 show a first alternative embodiment of the lateral guiding elements 12 according to the invention. In the embodiment of FIGS. 5 and 6 the wrapping table 5 is pivotable about a pivot axis A-A between a bale receiving position (FIG. 6) and a wrapping position (FIG. 5). Such tiltable wrapping table 5 is known in the art. When a bale is loaded on the wrapping table 5, the wrapping table 5 is for instance tilted forwards to receive a bale from a baler or a loading arm construction. A loading arm construction as described in PCT/NL/2010/000172, which is hereby incorporated by reference in its entirety, can be implemented. When a bale is received on the wrapping table, the wrapping table 5 is tilted to a substantial horizontal position which is optimal for wrapping of the bale.

The lateral guiding elements 12 are mounted on the wrapping table 5, while a guiding track 20 is mounted on the frame 2.

The pivot axis A-A of the wrapping table lies at a lower level than the supporting surface of the wrapping table 5 and thus also than the lateral guiding elements 12. The tilting movement of the wrapping table 5 also results in a translation of the wrapping table 5 with respect to the frame 2.

When the wrapping table 5 is moved from the bale receiving position to the wrapping position, the lateral guiding elements 12 are translated in the guiding track 20 from the open position to the closed position.

Due to this mechanism the lateral guiding elements 12 will be in the open position when a bale is arranged on the wrapping table, since the wrapping table 5 will be in the bale receiving position to receive the bale. When the wrapping table 5 is tilted back to the wrapping position for wrapping of the bale, the lateral guiding elements 12 are moved to the closed position, wherein the distance between the lateral guiding elements 12 substantially corresponds with the width of the bale 100. As a result, the lateral movement of the bale during wrapping is efficiently limited by the lateral guiding elements 12.

FIG. 7 shows a second alternative embodiment according to the invention. In the embodiment of FIG. 7 the lateral guiding elements 12 are pivotably mounted on the wrapping table 5. The lateral guiding elements 12 are pivotable about the pivot axis 14 between the open position and the closed position.

Each lateral guiding element 12 is coupled to an actuator 30 configured to move the respective lateral guiding element 12 between the open position and the closed position. The actuators 31 are preferably hydraulic cylinders, but any other suitable actuator may also be used.

For each actuator 30, a sensor 31 is provided to detect the presence of a bale on the wrapping table 5. The actuator 30 is configured to move or hold the lateral guiding elements 12 in the open position when no bale is detected on the wrapping table 5, and to move or hold the lateral guiding elements 12 in the closed position when a bale 100 is present on the wrapping table 5.

In alternative embodiments, one sensor 31 may be used for activation of both actuators 30, and even one actuator may be provided for actuation of both lateral guiding elements 12.

It is remarked that the wrapper shown in drawings 1 and 2 is a stand-alone wrapper configured to pick-up bales from a ground surface. The wrapper according to the invention may also be arranged in a baler-wrapper combination, wherein the bale after baling is directly transferred to the wrapper. Also the activation of the one or more actuators may be made dependent on the position of parts of the wrapper or other associated machinery, for instance the tilt position of the wrapping table 5.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A wrapper for wrapping bales, comprising:
a frame,
a wrapping table mounted on the frame to support the bale during wrapping, wherein the wrapping table is tiltable between at least a bale receiving position and a wrapping position, and
a wrapping device mounted on the frame to wrap wrapping material about the bale,
wherein the wrapper comprises at least two lateral guiding elements arranged to enclose a bale supported on the wrapping table to limit lateral movement of the bale, wherein the lateral guiding elements are freely pivotable about a pivot axis between an open position and a closed position, wherein the distance between top ends of the lateral guiding elements is larger in the open position than in the closed position.

2. The wrapper of claim 1, wherein at each of two opposite sides of the wrapping table at least one lateral guiding element is arranged to limit lateral movement of a bale supported on the wrapping table.

3. The wrapper of claim 1, wherein the distance between top ends of the lateral guiding elements is larger in the open position than in the closed position.

4. The wrapper of claim 1, wherein the pivot axis is arranged at a lower level than the lateral guiding elements, and wherein the pivot axis runs substantially in a plane parallel to a side plane of a bale supported on the wrapping table.

5. The wrapper of claim 1, wherein the lateral guiding elements are each coupled to an actuation element, wherein in the open position, the actuation element is positioned above a supporting surface of the wrapping table, and in the closed position the actuation element is positioned at the same level or below the supporting surface of the wrapping table.

6. The wrapper of claim 1, wherein the lateral guiding elements are arranged to move outward in response to the bale being positioned on the wrapping table.

7. The wrapper of claim 1, wherein the lateral guiding elements are mounted on the frame or mounted on the wrapping table.

8. The wrapper claim 1, wherein the distance between the lateral guiding elements at opposite sides of the wrapping table in the closed position substantially corresponds with the width of a bale to be wrapped.

9. The wrapper of claim 1, wherein the position of the lateral guiding elements is dependent on the position of the wrapping table, wherein when the wrapping table is in the bale receiving position the lateral guiding elements are arranged in the open position, and when the wrapping table is in the wrapping position the lateral guiding elements are arranged in the closed position.

10. The wrapper of claim 1, wherein the wrapper comprises a guiding track along which at least one of the lateral guiding elements is movable to move the lateral guiding element between the open position and the closed position.

11. The wrapper of claim 1, wherein the wrapper comprises an actuator to move the lateral guiding elements between the open and closed position.

12. The wrapper of claim 11, wherein the wrapper comprises a sensor to detect the presence of a bale on the wrapping table, and wherein the actuator is activated to move the lateral guiding elements from the open to the closed position, when the presence of a bale on the wrapping table is detected.

13. The wrapper of claim 1, wherein each lateral guiding element comprises a rotatable bobbin, wherein, when the lateral guiding elements are in the closed position, the axis of rotation of the bobbin is arranged substantially radially with respect to a circular side of a bale supported on the wrapping table.

* * * * *